United States Patent [19]
Wolf

[11] 4,343,999
[45] Aug. 10, 1982

[54] STEAM-ELECTRICAL GENERATING SYSTEM USING GEOTHERMAL HEAT SOURCE

[75] Inventor: Herman B. Wolf, Pineville, N.C.

[73] Assignee: Duke Power Company, Charlotte, N.C.

[21] Appl. No.: 204,000

[22] Filed: Nov. 4, 1980

[51] Int. Cl.³ .......................... F01K 7/38; F03G 7/04
[52] U.S. Cl. ........................................ 290/2; 60/641.2
[58] Field of Search ............................ 60/641.2; 290/2

[56] References Cited

U.S. PATENT DOCUMENTS

| | | | |
|---|---|---|---|
| 3,875,749 | 4/1975 | Baciu | 60/641.2 |
| 4,093,868 | 6/1978 | Manning | 290/2 |
| 4,201,060 | 5/1980 | Outmans | 60/641.2 |

Primary Examiner—J. V. Truhe
Assistant Examiner—Shelley Wade
Attorney, Agent, or Firm—Bell, Seltzer, Park & Gibson

[57] ABSTRACT

A liquid-to-liquid heat pump is utilized for supplying sufficient heat to generate steam from the condensate of a steam turbine. A liquid coolant is circulated through the condenser of the steam turbine for absorption of heat from the steam as the steam forms condensate. The liquid coolant is then circulated through the heat pump for recovery of the heat absorbed by the coolant during condensation of the steam. Sufficient transferred heat is transferred to the coolant to permit the heat pump to extract sufficient heat from the coolant to regenerate steam from the condensate. The transferred heat is supplied by a plurality of heat sinks buried in the earth to a sufficient depth so as to be in heat exchange relationship with the subterranean water system of the earth.

8 Claims, 1 Drawing Figure

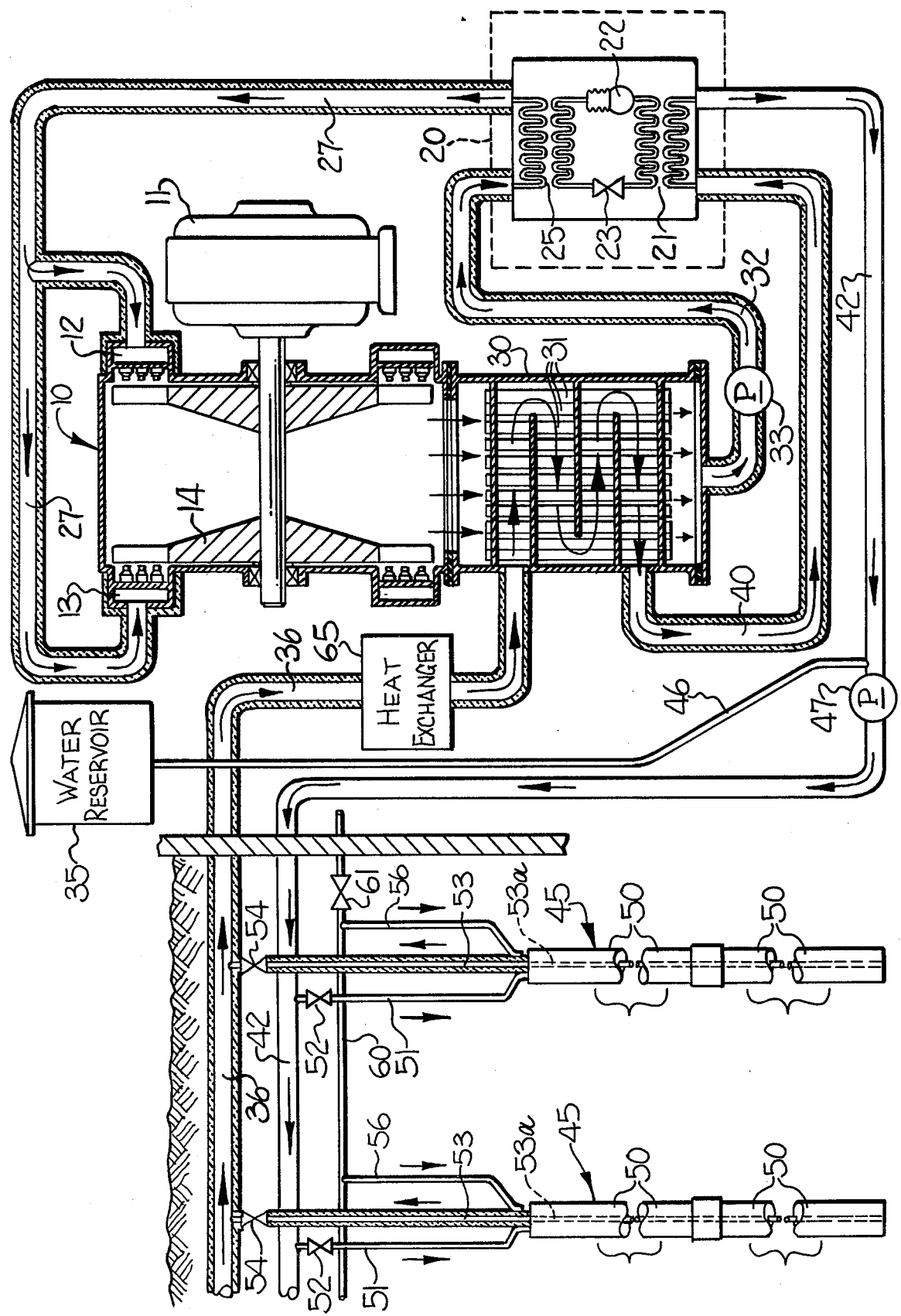

STEAM-ELECTRICAL GENERATING SYSTEM USING GEOTHERMAL HEAT SOURCE

This invention relates to a system for generating electrical power which provides a more efficient utilization of available energy and more particularly to such a system in which heat normally lost due to condensation of steam is substantially recovered and is supplemented by geothermal heat energy.

BACKGROUND OF THE INVENTION

Most systems for generating electrical power currently in use employ steam turbines as the motive means for operating the generators. The heat necessary for generating steam in sufficient quantities to operate a conventional electrical power generating plant is enormous and the sources from which such heat is derived are both expensive and cause certain ancillary problems. The most commonly used heat source materials currently being used are both expensive and are nonrenewable natural resources. Additionally, the burning of such fuels causes environmental problems unless substantial emission controls are employed, which controls are exceedingly expensive and reduce the efficiency of the system.

There are also in current use nuclear fuels which are used as heat source materials for generating steam for electrical power generation. However, the cost of nuclear fuel is high and the operation of this type of plant is expensive and difficult. While the supply of such nuclear fuels is virtually unlimited, safety measures are exceedingly difficult and expensive as is the initial construction of such nuclear power plants.

There have been considerable efforts expended in searching for alternate sources of energy to generate electrical power. Such alternate sources of energy have included wind energy, tidal energy and geothermal energy. Windmills for generating electrical power are in use, but are extremely limited in capacity and, to date, are very expensive. Tidal power plants are also in use, but require very special conditions which have limited their application to only a very few areas on the earth.

For geothermal power plants, it has heretofore been the practice to locate such plants only in the vicinity of faults in the earth's crust where the extremely high temperatures of the earth's core are relatively readily available. Such faults exist, however, only in a very few places and therefore geothermal power plants have not been extensively used.

With all of the steam-electrical generating systems currently in use, the condensation of the steam and the disposal of the heat absorbed by the coolant also poses substantial problems. The volume of cooling water required to effect such condensation is considerable and therefore such plants must be located adjacent a relatively large supply of water. In some of the more arid areas, this is a problem of considerable magnitude. Further, the effluent water is at a higher temperature and this poses certain environmental problems. The use of "cooling towers" poses high initial costs and high operating costs. To my knowledge, all such systems dispose of the heat absorbed by the cooling water and no attempts have been made to recoup any of this heat.

It is common knowledge that the center of the earth is extremely hot and that a skin of very dense rock separates the hot interior from the surface of the earth. Although this rock in the earth's skin is resistant to the passage of heat, nevertheless a small amount of heat per unit area is transmitted from the hot interior of the earth to the surface of the earth. The amount of heat transmitted from the center of the earth to the surface is found to be—

Heat (calories) $= 1.2 \times 10^{-6}$ per square cm. per second or 15.9 BTUs per square foot per hour.

The heat so transmitted through the earth's skin is absorbed by subterranean water which flows through a system of veins. These veins practically blanket the surface of the earth adjacent to the rock skin and vary in depth from the surface of the earth from approximately 100 feet to several hundred feet. In the Piedmont section of North Carolina and South Carolina, the depth is usually from 100 to 200 feet and the temperature of the water is substantially constant at approximately 60 degrees F. The temperature of the subterranean water in all areas of the United States is shown on page 155 of the September, 1980 issue of *Popular Mechanics* magazine. This temperature of the subterranean water is maintained by a loss of heat by conduction to the surface of the earth. The earth, stone, etc. between the subterranean water and the surface of the earth are fairly good conductors of heat because of the presence of moisture in the soil. Therefore, the input of heat from the center of the earth is balanced by the loss of heat, over a considerable time, from the subterranean water through the surface of the earth.

While it has been previously suggested that certain systems which employ coils, tanks or other liquid containers buried in the earth at depths ranging from open containers to coils or closed tanks buried several feet beneath the surface of the earth, be used as heat sources for heating enclosed spaces, these heat sinks have been limited in application even for residential heating purposes.

SUMMARY OF THE INVENTION

With the foregoing in mind, it is an object of the present invention to provide a steam-electrical generating system providing a more efficient utilization of heat energy by recouping substantial heat energy from effluent cooling water and by supplementing that with geothermal heat energy. This object is accomplished by providing a system which includes one or more liquid-to-liquid heat pumps including a closed circuit for circulating a refrigerant through a pair of heat exchangers. One heat exchanger adds heat to a liquid for forming steam and supplying the steam to a steam turbine connected to an electric generator. The other heat exchanger is in heat transfer relationship with a liquid in a closed liquid circulating system, including a source of liquid to maintain the system filled, for circulating the liquid through a plurality of heat sinks buried in the earth to a sufficient depth so as to be in heat exchange relationship with the subterranean water system of the earth for receiving cooled liquid and adding geothermal heat thereto. The liquid is then circulated through the condenser of the steam turbine so that additional heat is transferred to the liquid during condensation of the steam from the turbine and supplements the geothermal heat from the earth. This heated liquid is then circulated through the heat pump for use in the regeneration of the steam needed to operate the turbine.

BRIEF DESCRIPTION OF THE DRAWING

Other objects and advantages will appear as the description proceeds when taken in connection with the accompanying drawing which is a somewhat schematic view of the steam-electrical generating system of the present invention and illustrating the manner in which the heat sinks are connected to the steam turbine and liquid-to-liquid heat pump.

DESCRIPTION OF THE ILLUSTRATED EMBODIMENT

The present steam-electrical generating system includes a steam turbine, broadly indicated at 10, and an electric generator 11 drivingly connected to the steam turbine 10 and adapted to be rotated by the steam turbine for generating electricity. The steam turbine includes steam inlet manifolds 12, 13 which are adapted to direct steam against the blades of a turbine 14 to impart rotation thereto.

A liquid-to-liquid heat pump 20 is provided with a first heat exchanger 21 for adding heat to a refrigerant circulating through a compressor 22 and expansion valves 23 of the heat pump 20. The refrigerant also circulates through a second heat exchanger 25 for supplying heat from the refrigerant to a liquid to be heated.

Means is provided for supplying steam to the turbine 10 and includes steam conduit means connected to the second heat exchanger 25 of the heat pump 20 for receiving steam therefrom and supplying the same to the steam turbine 10. The steam conduit means includes a steam supply line 27 connected at one end to the output side of the second heat exchanger 25 and the other end of the supply line 27 includes separate branches connected to the steam manifolds 12, 13 of the steam turbine 10.

A condenser 30 is connected to the lower end of the steam turbine 10 and includes tubular passageways 31 for receiving steam from the steam turbine 10 and condensing the steam to a liquid at the lower end of the condenser 30. Liquid conduit means, in the form of a supply line 32, connects the output side of the condenser 30 to the input side of the second heat exchanger 25 for supplying condensate to the heat pump 20 for regeneration of steam therefrom. A boiler feed pump 33 is interposed in the line 32 for positively drawing the condensate from the condenser 30 and supplying it to the second heat exchanger 25 of the heat pump 20 at a pressure equal to the steam pressure.

Liquid circulating means is provided for supplying liquid coolant to the condenser 30 for condensing steam from the steam turbine 10 and for supplying heat to the first heat exchanger 21 of the heat pump 20. The liquid circulating means includes a closed liquid circulating system with a source of liquid, illustrated as a water reservoir 35, to maintain the system substantially filled with liquid.

The liquid circulating means also includes first conduit means, in the form of a supply line 36, connected at one end to the inlet side of the condenser 30 for supplying liquid coolant to the condenser 30 for condensing the steam to condensate as the liquid coolant is circulated within the condenser 30. A liquid line 40 is connected at one end to the outlet side of the condenser 30 and its other end is connected to the input side of the first heat exchanger 21 of the heat pump 20 for supplying the heat pump with liquid which has been heated by the condensation of the steam in the condenser 30 and by supplemental heat sources described below.

Second conduit means, in the form of a line 42, is connected at one end to the output side of the first heat exchanger 21 of the heat pump 20 for withdrawing liquid which has given off heat and been cooled in the first heat exchanger 21. The other end of the line 42 is connected to the input sides of the plurality of heat sinks, broadly indicated at 45, which are buried in the earth to a sufficient depth so as to be in heat exchange relationship with the subterranean water system of the earth. The details of the heat sinks 45 are shown in my copending application Ser. No. 151,583, filed May 20, 1980, now U.S. Pat. No. 4,325,228, the disclosure of which application is incorporated herein by reference thereto.

A line 46 is connected at one end to the water reservoir 35 and its other end is suitably connected to the line 42 for maintaining the system substantially filled with liquid. A pump 47 is interposed in the line 42 to circulate the liquid through the heat sinks 45, the condenser 30 and the first heat exchanger 21 so that the heat transferred to the liquid coolant during condensation of the steam is recovered and supplemented by geothermal heat from the earth, by means of the heat sinks 45, for regeneration of the steam needed to operate the steam turbine 10.

As indicated above, the heat sinks 45 are of the same type as illustrated in my copending application and each heat sink 45 includes two elongate liquid containers 50 which are coupled together at their adjacent ends. The liquid containers 50 have high thermal conductivity and are of a shape to provide a large amount of surface contact with the earth and of a length, relative to cross-sectional area, to provide a liquid dwell time sufficient for transfer of the required amount of heat between the earth and subterranean water system and the liquid passing through the containers 50. Each container 50 preferably is in the form of a cylindrical metal tube which is six inches in diameter and twenty feet in length. A liquid inlet conduit 51 is connected at its lower end to the upper end of the container 50 and connected at its upper end to the line 42 which serves as a manifold for supplying liquid to each of the heat sinks 45.

An adjustment valve 52 is preferably provided in the liquid inlet line 51 for balancing the amount of liquid supplied to each of the heat sinks 45. An outlet conduit 53 extends longitudinally within the center of the container 50 and is thermally insulated from the liquid in the container substantially throughout its length. The lower end of the outlet conduit 53 terminates adjacent the bottom of the container 50 and the upper end is connected to the line 36, which serves as a return manifold for the liquid. A regulator valve 54 is interposed in the outlet conduit 53 for balancing the flow of liquid through the plurality of heat sinks 45.

The heat sinks 45 are positioned in the earth in a generally vertical orientation and at a sufficient depth to provide a good heat transfer relationship with the subterranean water system of the earth. Generally, the medial portion of the liquid container 50 will be buried in a drilled well hole to a depth of approximately 100 to 200 feet so that the lower end portion thereof is either in direct contact with or fairly closely adjacent to the subterranean water system of the earth. It has been found that a heat sink made up of two twenty-foot sections of liquid container 50 and buried in the earth at 135-foot level provides a BTU per hour capacity of 50,000.

In order to increase the thermal conductivity between the outer surface of the container 50 and the surrounding earth and adjacent subterranean water system, means is provided for periodically dispensing a liquid into the soil surrounding the container 50 so that the soil is maintained in a moist state. The liquid is dispensed onto the upper end of the container 50 through the lower end of a supply line 56 which is suitably connected adjacent its upper end to a suitable water supply line 60. A suitable regulator valve, in the form of a solenoid operated valve 61, is provided in the supply line 60 so that the liquid is dispensed at the proper time to maintain the soil surrounding the container 50 in a sufficiently moist condition.

A heat exchanger 65 is illustrated in the line 36 returning the liquid from the heat sinks 45 to the condenser 30. This heat exchanger 65 may be supplied heat from the operating motor of the compressor 22 of the heat pump 20, heat from the circulating pumps 33 and 47, as well as heat from the water cooled generator 11 to supply additional heat to the liquid being returned from the heat sinks 45. In order to increase the efficiency of the system, suitable thermal insulation is preferably provided around the steam inlet manifolds 12, 13, the steam supply line 27, condensate line 32, supply lines 36, 53, and liquid line 40, as indicated by the section lines in the drawing.

In some instances, it may be desirable to use a fuel fired heat exchanger as a supplemental heat energy source in the generation of steam for producing electrical power. In this case, the heat sinks may be eliminated and the fuel fired heat exchanger may be positioned between the output side of the first heat exchanger of the heat pump and the input side of the condenser. The fuel fired heat exchanger would then be used to heat the circulating cooling water to a temperature of approximately 60 degrees F. at the entrance of the condenser. It is also contemplated that both the heat sinks and a fuel fired heat exchanger could be employed in accordance with this invention.

The system for generating electrical power of the present invention has been generally described and a specific, but nonlimiting, example will be given of a particular pilot installation. Assuming it is desired to provide a steam-electrical generating plant producing a net output of 10,000 Kw., and assuming a plant efficiency of 66⅔%, sufficient energy must be provided to produce a gross of 15,000 Kw. Also, assuming 33% of the steam energy produced will be converted to mechanical energy in the steam turbine 10, then the total steam energy produced must equal 45,000 Kw. Under these circumstances, the heat required will be 153,585,000 BTUs per hour.

Preferably, the steam turbine 10 is operated under a steam pressure of two pounds absolute per square inch and the condenser pressure will be one pound absolute per square inch. The boiler feed pump 33 operates to raise the pressure of the condensate from the condenser 30 from one pound to two pounds absolute per square inch. The steam turbine 10 will require 137,620 pounds of steam per hour and will produce 2,293 pounds of condensate per minute or 294.8 gallons of condensate per minute (2,293 divided by 8.345). The heat leaving the condenser 30 in the form of a condensate is 2,293 pounds X (100-32) or 68 degrees to equal 155,924 BTUs per minute or 9,355,440 BTUs per hour.

The heat entering the condenser is ⅔ of 2,557,750 or 1,705,166 BTUs per minute. Therefore, subtracting the heat leaving the condenser in condensate (1,705,166-155,924) produces a net heat to the cooling liquid of 1,549,244 BTUs per minute. The net heat to the cooling liquid in the condenser 30 of 1,549,244 BTUs per minute produces a temperature rise in the cooling water of approximately 35 degrees as it passes through the condenser 30. In order to determine the amount of cooling water required, 1,549,224 BTUs is divided by 35 to equal 44,263 pounds per minute or 5,304 gallons per minute (44,263 divided by 8.345).

To produce the 153,585,000 BTUs per hour of heat required to produce the steam for the turbine 10, the rating of the heat pump should be 144,229,550 BTUs per hour (determined by subtracting the heat in the condensate 9,355,440 from the heat requires 153,585,000). To produce this heat pump rating of 144,229,550 BTUs per hour, it is estimated that eight Westinghouse type 126 heat pumps connected in parallel would be required.

In order to determine the proper number of heat sinks to be needed, it is necessary to assume that the heat sinks will supply 15,000 Kw. minus the heat in the condensate used as 100-degree water to the feed pump or 15,000 times 3,413 equals 51,195,000 BTUs per hour less 9,355,440 to equal 41,839,560 BTUs per hour to be produced by all of the heat sinks. The total output of 41,839,560 BTUs is divided by 50,000 to equal 836.8 or 839 heat sinks. The circulating coolant water through each heat sink is determined by dividing 5,304 gallons by 839 to equal 6.32 gallons per minute.

In operation of the steam-electrical generating system described above, the pump 47 circulates the coolant water to the heat sinks 45 through the manifold 42 at the rate of 5,304 gallons per minute and the valves 52, 54 are regulated so that the coolant water is passed downwardly through the cylindrical containers 50 of each heat sink 45 at the rate of 6.32 gallons per minute to provide a sufficient dwell time that the temperature of the coolant water will be exposed to the 60-degree F. temperature surrounding the heat sinks for a sufficient time to raise the temperature of the coolant water sufficiently so that 50,000 BTUs per hour will be produced by each of the heat sinks. The coolant water returning through the manifold 36 has thus been exposed to and heated by the geothermal heat source (heat sinks 45) as it passes through the heat exchanger 65. The liquid coolant is additionally heated by the heat exchanger which is supplied heat from the operating motor of the compressor 22 of the heat pump 20, from the operating motors of the circulating pumps 33 and 47, as well as heat from the generator 11. The liquid coolant is then circulated through the condenser 30 and picks up additional heat from the steam passing through the passageways 31 and being cooled by the liquid coolant to change the steam to condensate. As the liquid coolant leaves the condenser 30, passing through the line 40, the temperature will be raised approximately 35 degrees and the liquid coolant will enter the heat exchanger 21 of the heat pump 20 at a temperature of approximately 95 degrees F. In the heat exchanger 21, the temperature of the liquid coolant will be reduced as heat is transferred to the refrigerant of the heat pump 20 and the liquid coolant will be returned to the heat sinks at a greatly reduced temperature of approximately 30 to 35 degrees F. In the heat pump 20, the refrigerant, heated by the first heat exchanger 21 will be further compressed and the temperature raised by the compressor 22 and fed through the heat exchanger 25 and the heat of the refrigerant will be transferred, in the heat exchanger 25 to the steam conduit means to produce steam in the line 27 and direct the same to the steam turbine 10 for rotation of the turbine 14 and thereby rotate the generator 11 to produce electrical energy. As the steam passes through the tubular passageways 31 of the condenser 30, it is cooled by the liquid coolant and converted to condensate, which is raised to steam pressure and circulated by the boiler feed pump 33 through the line 32 and to the input side of the heat exchanger 25 where it is again heated and regenerated to produce steam for operating the steam turbine 10. Thus, steam-electrical power is generated by the system of the present invention by providing an efficient utilization of available energy and supplementing this with geothermal energy obtained from the subterranean water of the earth.

In the drawing and specification there has been set forth a preferred embodiment of the invention, and although specific terms are employed, they are used in a generic and descriptive sense only and not for purposes of limitation, the scope of the invention being defined in the claims.

That which is claimed is:

1. A system for generating electrical power characterized by a more efficient utilization of available energy supplemented by geothermal energy, said system comprising
    (a) a steam turbine;
    (b) an electric generator connected to said steam turbine and adapted to be rotated by said steam turbine for generating electricity;
    (c) liquid-to-liquid heat pump means including a first heat exchanger for adding heat to a refrigerant circulating within the heat pump and a second heat exchanger for supplying heat from the refrigerant to a liquid to be heated;
    (d) means for supplying steam to said turbine including steam conduit means connected to said second heat exchanger of said heat pump for receiving steam therefrom and to said steam turbine for supplying steam thereto, a condenser connected to said steam turbine for receiving steam therefrom and condensing such steam to a liquid, liquid conduit means connecting said condenser to said second heat exchanger of said heat pump, and pressure raising pump means in said liquid conduit means for supplying condensate to said heat pump for generation of steam therefrom; and
    (e) liquid circulating means for supplying liquid coolant to said condenser for condensing steam from said steam turbine and for supplying heat to said first heat exchanger of said heat pump comprising a closed liquid circulating system including a source of liquid of sufficient volume to maintain the system substantially filled with liquid, first conduit means connected to said condenser for supplying liquid coolant to said condenser and connecting said condenser to said first heat exchanger of said heat pump for supplying said heat pump with liquid which has been heated by the condensation of the steam, second conduit means connected to said first heat exchanger of said heat pump for withdrawing liquid which has been cooled in said first heat exchanger of said heat pump, a plurality of heat sinks buried in the earth to a sufficient depth so as to be in heat exchange relationship with the subterranean water system of the earth and connected to said second conduit means for receiving cooled liquid therefrom for the addition of geothermal heat thereto and connected to said first conduit means for supplying liquid thereto, and means for circulating the liquid through said conduit means, said condenser, said first heat exchanger, and said heat sinks; whereby the heat transferred to the coolant during condensation of the steam from said turbine is recovered and is supplemented by geothermal heat from the earth for regeneration of the steam needed to operate said steam turbine.

2. A system according to claim 1 wherein said steam turbine is of the low pressure type adapted to operate at a pressure of approximately two pounds absolute per square inch.

3. A system according to claim 1 including means for periodically dispensing a liquid onto the upper ends of each of said heat sinks for maintaining the earth surrounding said heat sinks to a moist state to increase the thermal conductivity between said heat sinks and the surrounding earth and subterranean water system.

4. A system according to claim 1 wherein each of said heat sinks has a BTU per hour capacity rating of about 50,000.

5. In a system for generating electrical power including an electric generator, a steam turbine for rotating said generator to generate electricity, and means for supplying steam to said turbine including steam generating means and condenser means for condensing steam leaving said turbine and for supplying the resulting condensate to said steam generating means for regeneration of steam therefrom, the improvement thereto wherein said steam generating means comprises
    (a) liquid-to-liquid heat pump means for supplying sufficient heat to generate steam from the condensate,
    (b) means for circulating a liquid coolant through said condenser means for absorption of heat from the steam to effect condensation thereof and for circulating the effluent coolant from said condenser means through said heat pump for recovery of the heat absorbed by the coolant during condensation of the steam leaving said turbine, and
    (c) geothermal means operably asociated with said coolant circulating means for supplying sufficient heat to the coolant to permit said heat pump to extract sufficient heat from the coolant to regenerate steam from the condensate.

6. In an electrical power generating system according to claim 5 wherein said geothermal heat supplying means comprises a plurality of heat sinks buried in the earth in heat exchange relationship with the subterranean water system of the earth.

7. In an electrical power generating system according to claim 6 wherein said geothermal heat supplying means further comprises means for collecting heat generated in the operation of said generator, said heat pump and said liquid circulating means and for supplying that heat to the coolant.

8. In an electrical power generating system according to any one of claims 5-7 wherein said heat pump means comprises a plurality of heat pumps connected in parallel for supplying the heat necessary to generate steam.

* * * * *